United States Patent [19]
Patino et al.

[11] Patent Number: 6,023,150
[45] Date of Patent: Feb. 8, 2000

[54] OPTIMIZED METHOD FOR DETERMINING REMAINING LIFE CYCLES IN A RECHARGEABLE BATTERY

[75] Inventors: Joseph Patino, Pembroke Pines; Russell L. Simpson, Miami, both of Fla.

[73] Assignee: Motorola, Inc., Schaumburg, Ill.

[21] Appl. No.: 09/126,655

[22] Filed: Jul. 31, 1998

[51] Int. Cl.⁷ .................................................. H01M 10/44
[52] U.S. Cl. ........................ 320/132; 324/427; 340/636
[58] Field of Search .................................. 320/132, 134, 320/136, DIG. 21; 324/427, 430, 431; 340/636

[56] References Cited

U.S. PATENT DOCUMENTS

| | | | |
|---|---|---|---|
| 4,678,998 | 7/1987 | Muramatsu | 320/136 |
| 4,888,716 | 12/1989 | Ueno | 324/430 |
| 5,352,968 | 10/1994 | Reni et al. | 320/136 |

*Primary Examiner*—Peter S. Wong
*Assistant Examiner*—Gregory J. Toatley, Jr
*Attorney, Agent, or Firm*—Barbara R. Doutre

[57] ABSTRACT

A method (200) of estimating existing and/or remaining life cycles of a battery pack (102) having an internal battery cell (104) and battery pack circuitry (110) is based on determining an impedance value of the internal battery cell (Zcell) (104), measuring the battery pack temperature (212), compensating the internal battery cell impedance based on the temperature (218), and estimating the remaining battery life based on the compensated internal battery cell impedance (220). The estimated life cycle value is then communicated to a user through either a charger or radio (112).

6 Claims, 3 Drawing Sheets

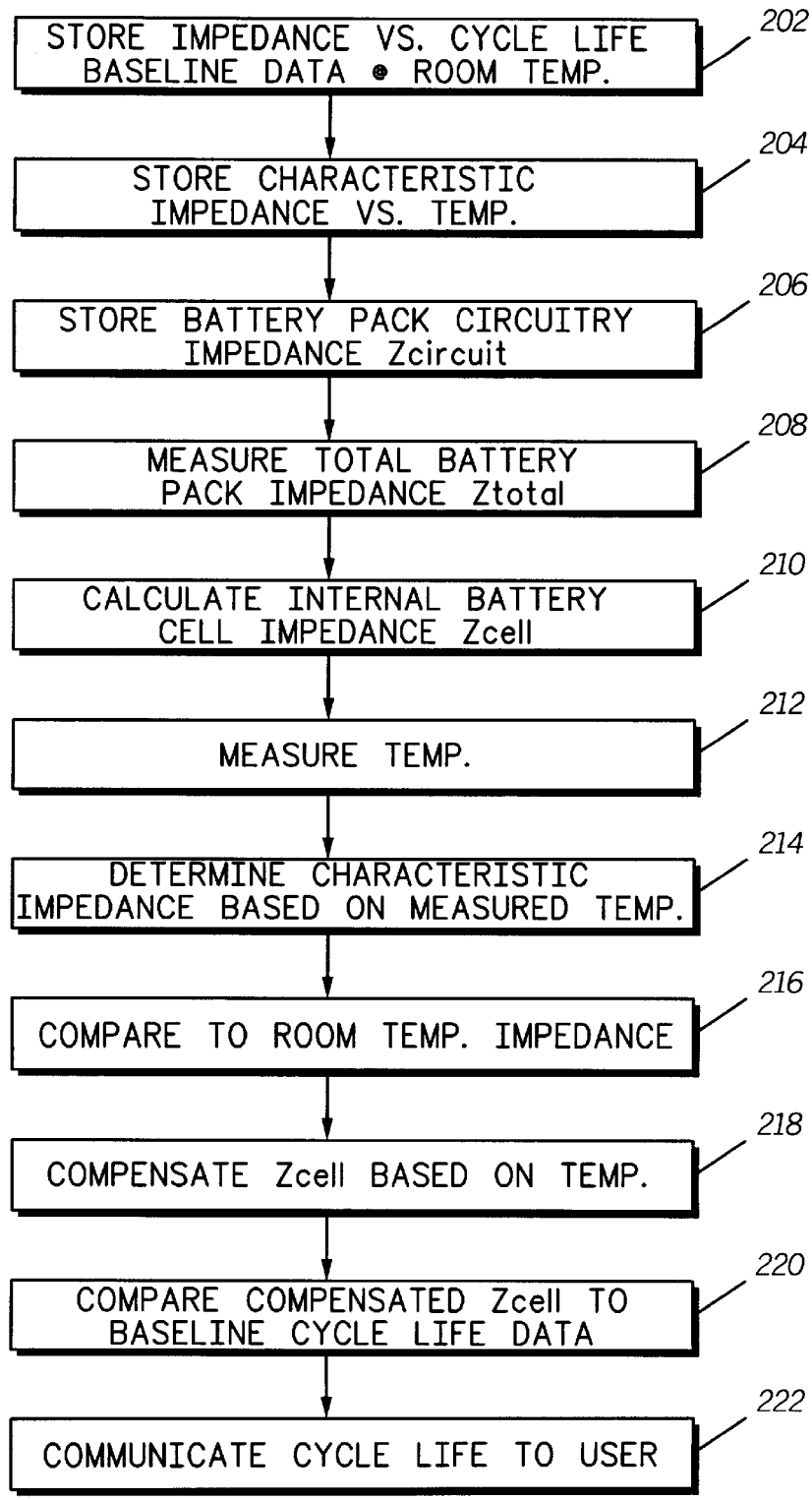

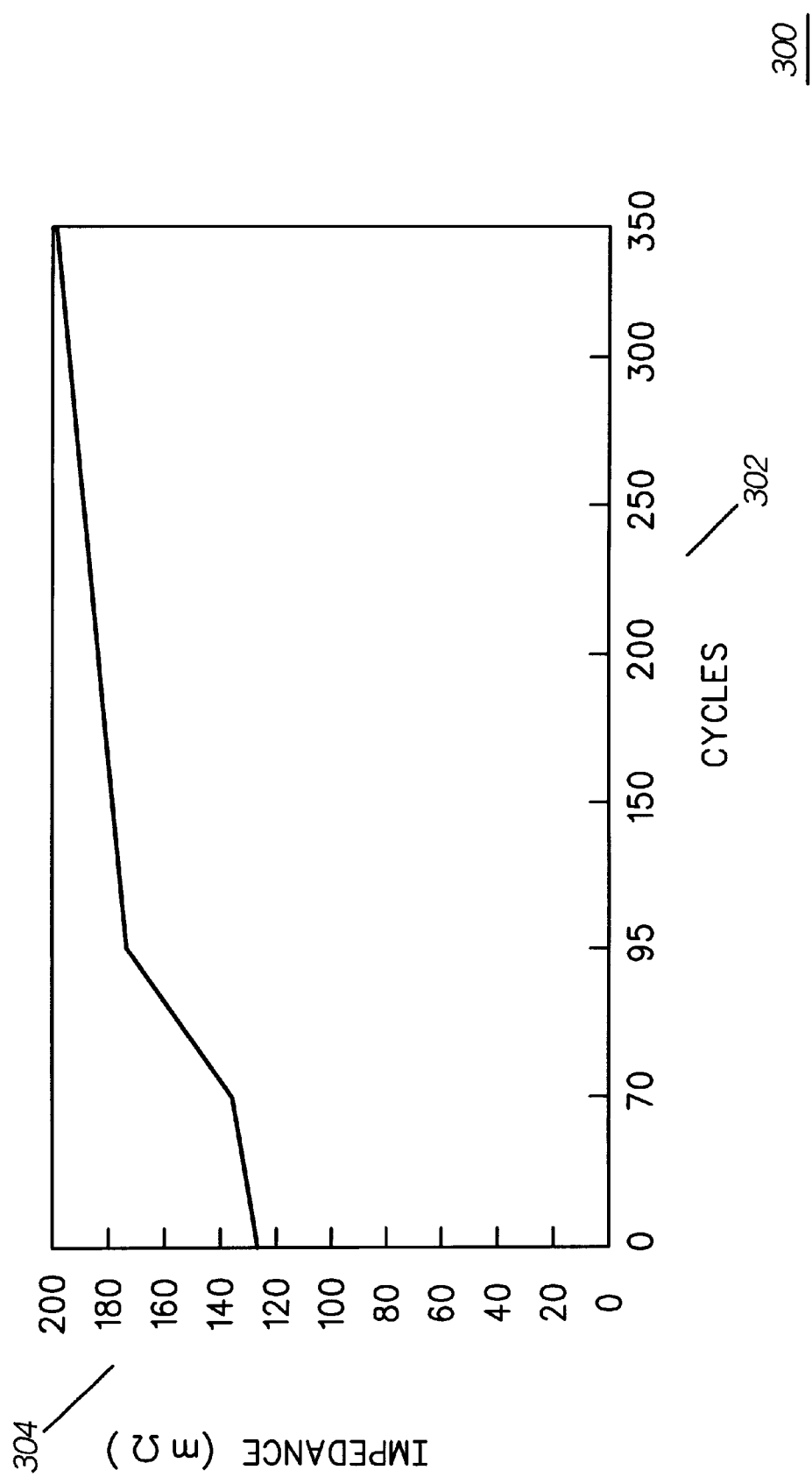

OPTIMIZED METHOD FOR DETERMINING REMAINING LIFE CYCLES IN A RECHARGEABLE BATTERY

TECHNICAL FIELD

This invention relates to techniques for determining existing and remaining cycle life in rechargeable battery packs.

BACKGROUND

Portable battery operated electronic products, such as radios and cell phones, have become staples to the average consumer's everyday life. The usable life of a rechargeable battery decreases with usage and time making it important for users to be able to identify when to replace their rechargeable batteries. Users of portable radios presently lack an easy way of determining the remaining useful life cycle expectancy of their batteries.

Accordingly, it would be advantageous to have an estimation of the remaining life cycle expectancy of rechargeable battery packs. Having the capability of estimating battery life cycles without additional hardware in the battery, charger, or radio would be a further advantage in terms of cost and manufacturing issues.

BRIEF DESCRIPTION OF THE DRAWINGS

FIG. 2 is a flowchart of a charging method in accordance with the present invention.

FIG. 3 is a graph showing an example of internal battery cell impedance (mΩ) versus cycle life.

DETAILED DESCRIPTION OF THE PREFERRED EMBODIMENT

Figure 1:
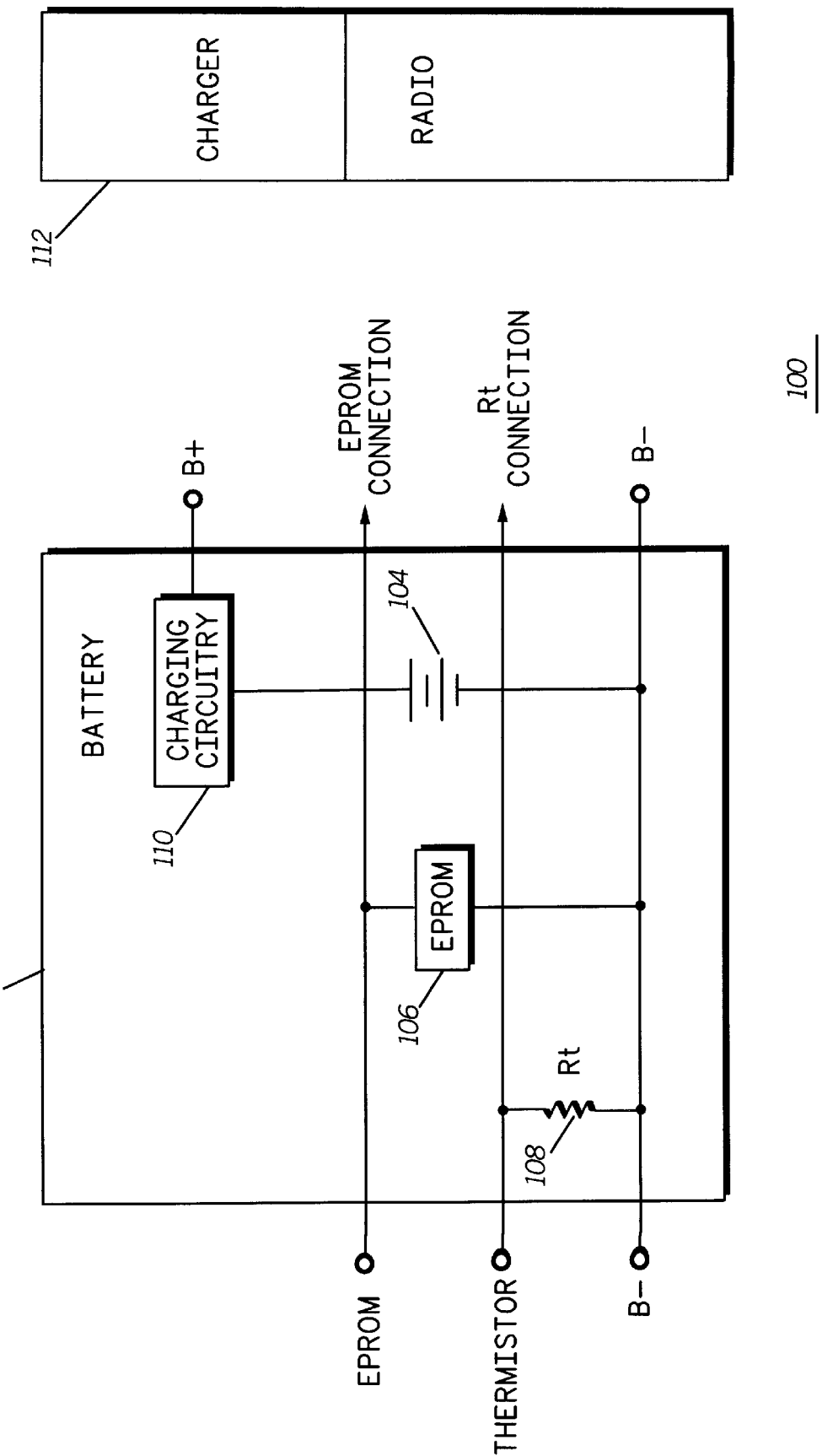
FIG. 1 a typical battery charging system.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is shown a prior art charging system 100. System 100 includes a battery pack 102 and charger 112. Included within the battery pack 102 are internal battery cells 104, an EPROM 106, thermistor 108, as well as other possible charge circuitry 110 such as a flex circuit, FETs, and polyswitches. A typical charging routine determines the voltage at which to charge the cell(s) 104 by reading the EPROM 106. The charging method to be described herein determines available battery cycle life by compensating the internal cell impedance for variations in temperature.

Referring now to FIG. 2, there is shown a flowchart representing a battery charging method 200 in accordance with the present invention. The method starts at step 202 by storing, into the battery memory, baseline room temperature battery information characterizing internal battery cell impedance (mΩ) versus cycle life. At step 204 a history of characteristic internal battery cell impedance versus temperature is stored in battery memory. The battery pack circuitry impedance (Zcircuit) is also stored into battery memory, at step 206, where Zcircuit may include, but is not limited to, such circuitry as flex, polyswitches, and FETs, but does not include the internal cell impedance.

The total battery pack impedance is measured at step 208, preferably by applying trickle current (I1) across the charge terminals (B+/B−) to the battery pack and measuring the pack voltage (V1) and then applying rated charge current (I2) and measuring the pack voltage (V2) and then calculating total impedance as: Ztotal=(V1−V2)/(I1−I2). Next, the cell impedance is calculated at step 210 as Zcell=Ztotal−Zcircuit. The temperature of the battery cell(s) is then determined by measuring the thermistor value at step 212.

The characteristic internal battery cell impedance for the measured temperature is determined at step 214 based on the information stored at step 204. At step 216, the internal battery cell impedance value determined at step 214 is compared with the room temperature impedance value based on the information stored at step 204, and a delta between the two impedances is taken. The internal battery cell impedance (Zcell) is then compensated by adding or subtracting the delta amount at step 218. For temperature measurements higher than room temperature the delta gets added. For temperature measurements below room temperature the delta gets subtracted. The compensated cell impedance is then compared, at step 220, to the available life cycle history stored at step 202 to get an estimate of the existing and/or remaining life cycles. The estimated remaining life cycles are then communicated to the user, such as through a display or audible tone, at step 222.

Note that the steps of storing the various information need not occur in any particular order. As an example, a Table storing the following temperature data and characteristic cell impedance can be stored in the battery's memory.

TABLE

| TEMPERATURE (Celsius, ° C.) | Internal Cell Impedance (mΩ) |
|---|---|
| −20 | 210 |
| −10 | 170 |
| 0 | 155 |
| +25 (room) | 140 |
| +60 | 135 |

Next, data such as that shown in graph 300 of FIG. 3 can be stored to represent the available life cycles 302 for a given cell impedance 304. A battery with a measured temperature of 60° C. would have an expected characteristic impedance of 135 mΩ according to the stored Table. When this value is compared to the expected cell impedance value at room temperature of 140 mΩ, the delta is determined to be 5 mΩ. This delta of 5 mΩ is then added (temperature measurement higher than room) to the calculated internal cell impedance (Zcell) in order to compensate the internal cell impedance for the variations in temperature. A calculated internal cell impedance (Zcell) of 180 mΩ would thus have the 5 mΩ delta added to it to achieve a compensated cell impedance value of 185 mΩ. This compensated impedance value provides an estimated 200 life cycles when compared to the graph 300. This estimated actual life cycle value can then be communicated to the user. Alternatively, a remaining life cycle value which equals the total number of expected cycles minus the actual number of cycles can be communicated to the user.

Thus, there has been provided a technique for estimating remaining life cycles of a rechargeable battery by compensating the internal cell impedance for variations in temperature. This life cycle estimate may be communicated to the user through either a radio or charger. A more accurate estimate of remaining life cycles may now be communicated to the user without the use of additional hardware in either the charger or the radio.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for estimating remaining life cycles in a battery pack having an internal battery cell, a memory device, and battery pack circuitry, including the steps of:

storing battery pack circuitry impedance (Zcircuit) into memory;

measuring total battery pack impedance (Ztotal);

determining an impedance value of the internal battery cell (Zcell) by subtracting off the stored battery pack circuitry impedance (Zcircuit) from the total battery pack impedance (Ztotal);

measuring the battery pack temperature;

compensating the internal battery cell impedance (Zcell) based on the temperature; and estimating the remaining battery life based on the compensated internal battery cell impedance.

2. A method of determining remaining life cycles of a battery pack having at least one internal battery cell, a memory device, and battery pack circuitry, including the steps of:

storing baseline battery cell impedance versus estimated life cycle information into memory;

storing the battery pack circuitry impedance (Zcircuit) into memory;

storing characteristic internal battery cell impedance versus temperature into memory;

measuring the internal battery cell impedance (Zcell);

measuring the battery pack temperature;

determining the characteristic internal cell impedance based on the measured temperature and the characteristic battery cell impedance versus temperature stored into memory;

comparing the determined characteristic internal cell impedance to a room temperature cell impedance by taking a delta;

compensating the measured internal battery cell impedance with the delta; and estimating the remaining life cycles based on the compensated internal battery cell impedance and the stored baseline battery cell impedance versus estimated life cycle information.

3. The method of claim 2, wherein the step of measuring the internal battery cell impedance includes the step of measuring a total impedance of the battery pack and subtracting off the stored battery pack circuitry impedance.

4. The method of claim 3, wherein the estimated remaining life cycles are communicated to a user.

5. The method of claim 4, wherein the step of measuring the internal battery cell impedance (Zcell) through the step of estimating are performed in a charger.

6. The method of claim 4, wherein the step of measuring the internal battery cell impedance (Zcell) through the step of estimating are performed in a charger.

* * * * *